Patented Oct. 26, 1937

2,097,154

UNITED STATES PATENT OFFICE 2,097,154

CONVERSION OF UNSATURATED ALCOHOLS AND/OR ETHERS TO THEIR SATURATED ISOMERS

Herbert P. A. Groll, Oakland, and Clarence J. Ott, Berkeley, Calif., assignors to Shell Development Company, San Francisco, Calif., a corporation of Delaware No Drawing. Application July 17, 1933
Serial No. 680,782

22 Claims. (Cl. 260—138)

This invention relates to the conversion of unsaturated alcohols and/or ethers to their saturated isomers containing a carbonyl group and, more specifically, is concerned with the conversion of unsaturated alcohols and/or ethers, containing four or more carbon atoms to the molecule, in the presence of solid substances, preferably possessing relatively large surfaces, which substances may have active surfaces due to their chemical constitution and/or their ultra porosity.

Of the broad class of unsaturated alcohols described, we obtain especially good results when working with those containing a tertiary carbon atom contiguous to a double bond, which tertiary carbon atom may or may not be adjacent to the carbinol group. Good results can be obtained with compounds as $$CH_2=C(CH_3)-CH_2OH, \quad CH_2=C(C_2H_5)-CH_2OH,$$
$$CH_2=C(C_3H_7)-CH_2OH, \quad CH_2=C(C_4H_9)-CH_2OH,$$

etc. Alcohols which contain a tertiary carbon atom in various relationships to the carbinol group are contemplated as $$CH_2=C(CH_3)-CHOH(CH_3), \quad CH_2=C(C_2H_5)-CHOH(CH_3),$$
$$CH_2=C(C_2H_5)-CHOH(C_2H_5), \quad CH_2=C(C_3H_7)-CHOH(CH_3),$$
$$CH_2=C(C_3H_7)-CHOH(C_2H_5), \quad CH_2=C(C_3H_7)-CHOH(C_3H_7),$$
$$CH_2=C(CH_3)-CHOH(C_2H_5), \quad CH_2=C(CH_3)-CHOH(C_3H_7),$$
$$CH_3CH=C(CH_3)-CH_2OH, \quad CH_3-CH=C(CH_3)-CHOH(CH_3),$$
$$(H_3C)_2C=CHCH_2OH, \quad (H_3C)(H_3C_2)C=C(CH_3)-CH_2OH,$$
$$(H_3C)_2C=C(CH_3)-CH_2OH,$$

etc. and their homologues. Instead of the alkyl derivatives, the aryl and aralkyl derivatives may be resorted to, as

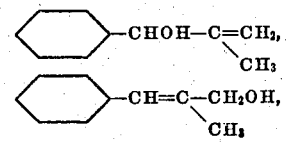

in which cases, the cyclic nuclei may be heterocyclic as well as carbocyclic. In all cases the carbinol group is of a primary or secondary character.

We have found that unsaturated alcohols of the character described can be converted or rearranged to the corresponding saturated aldehydes and ketones when passed over a solid substance which has an active surface due to its chemical character and/or to its degree of subdivision. Among others may be mentioned nonmetallic catalysts as active alumina, active silica, diatomaceous earths, fuller's earth, active charcoal, silica gel, thorium oxide, clay, zinc oxide, porous porcelain chips, pumice, common brick screenings, etc. as well as metallic catalysts as colloidal copper, and reduced copper. Between catalysts which are essentially of a basic nature, i. e. metal oxides as $Al_2O_3$, ZnO, $ThO_2$, etc. and neutral substances like silicates, clay, charcoal, pumice, etc., the latter group comprises the most desirable catalysts. The catalysts of the oxide group are more active and generally applicable but cause more side reactions.

The temperatures to be used vary widely with the nature of the catalyst and the character and number of carbon atoms in the molecule of the unsaturated alcohol. The lower temperature limit of reaction is about 120° C. Porous porcelain acts well at 200° C. and reaches its maximum efficiency at 300 to 350° C. Burnt clay, silica gel, thorium silicate and active charcoal show very similar temperature zones of activity.

Some dehydrogenation takes place with most catalysts at temperatures above 400° C. Aluminum oxide and thorium oxide favor uncontrollable condensation side reactions at low temperatures and cause dehydration to acetylenes and diolefines and other decomposition at higher temperatures. Zinc oxide, as well as copper, at higher temperatures acts as a powerful dehydrogenation catalyst. Pumice acts only around and above 500° C., but it is a catalyst as can be proven by the fact that no reaction occurs at the same temperatures over pyrex fragments and fused quartz. At 550° or higher, pyrolysis with and without catalysts occurs. This is about the upper limit of any practical rearrangement process. At the lower limit of the activity range some aldol or ketol formation with subsequent dehydration takes place, which, in certain cases, provides useful by-products.

The conversion or rearrangement may be carried out in the vapor phase by passing the vapor of the alcohol over the catalyst or in the liquid phase by agitating the catalyst, preferably finely divided, with the alcohol in an enclosed vessel, under pressure if the reaction temperature exceeds the boiling point.

Obviously, the catalysts working at lower temperatures are more suitable for liquid phase operation than those working at higher temperatures while both may be used for vapor phase operation.

When catalysts (metallic or otherwise), having dehydrogenating properties, are applied, the reaction may be applied under superatmospheric pressure in order to avoid dehydrogenation. The process can also be executed at relatively higher temperatures when operating at superatmospheric pressures.

The rearrangement method is also applicable to ethers of the alcohols mentioned and to mixtures of ethers with the alcohols provided some steam is used with the vapors.

Example I

Isobutenol was passed over highly active copper at 258° C., at atmospheric pressure. The yield of isobutyraldehyde (on the isobutenol converted) was 76%.

Example II 100 gm. isobutenol and 5 gm. copper powder were heated in a bomb to 200° C. When this temperature was reached the bomb was shaken on a mechanical shaker. The reaction started immediately as indicated by a steady rise of pressure. After 2 hours the experiment was interrupted. 11.5 gm. isobutyraldehyde were found in the product. The rest of the isobutenol was unchanged.

Example III 100 gm. isobutenol and 5 gm. powdered porous porcelain were shaken at 200° C. for 2 hours. The product contained 40.6% isobutyraldehyde and 59.4% unchanged isobutenol.

Example IV 100 gm. isobutenol and 5 gm. active charcoal were shaken for 2 hours at 200° C. 29% was converted to aldehyde, the rest being unchanged isobutenol.

Example V

Isobutenol vapors were passed through active charcoal at 505° C. at a rate of 50 cc. liquid per minute per liter catalytic space. 49% of the alcohol was converted to isobutyraldehyde.

Example VI

Isobutenol was passed at 350° C. over active silica at a rate of 50 cc. liquid per minute per liter catalytic space. 75% conversion to aldehyde took place. The rest of the raw material was unchanged and was recirculated into the process.

Example VII

Technical isobutenol containing 10% diisobutenyl ether was passed over broken porous porcelain at 350° and 50 cc. liquid per minute per liter catalytic space. The conversion to isobutyraldehyde was 95% of the total.

Example VIII

Wet diisobutenol ether, B. P. 134° C., was passed over porous porcelain chips at 350° C. at 5 cc. liquid per minute per 100 cc. catalytic space. 20% of the ether was converted to isobutyraldehyde, the rest remained unchanged.

Example IX

Isobutenol was passed over porous porcelain at 250° at 50 cc. liquid per minute per liter catalytic space. 85% was converted to isobutyraldehyde and 15% to a condensation product of higher molecular weight.

Example X

The top layer of the azeotropic mixture of isobutenol and water was passed through brick screenings at 375° C. at 50 cc. liquid per minute per liter catalytic space. 90% of the isobutenol was converted to aldehyde, 4% to a condensation product of higher molecular weight, and 6% remained unchanged.

Example XI

Isobutenol was passed over pumice at 510° C. A 38% conversion to aldehyde took place, the rest of the isobutenol was unchanged. When the pumice was replaced by pieces of pyrex glass no conversion took place. Similarly no conversion was observed with fused quartz at this temperature.

Example XII 2 methyl butene-1 ol-3 was passed over silica gel at 300° C. at a rate of 4 cc. liquid per minute per 100 cc. catalytic space. 93% of the alcohol was converted to methyl isopropyl ketone, B. P. 94° C., the rest was unchanged alcohol.

Example XIII

Phenyl isopropenyl carbinol B. P. 222–224° C. was passed over active alumina at 300° C. The yield of isopropyl phenyl ketone was 73%. Some higher boiling condensation product was formed.

Example XIV 2-ethyl propene-1 ol-3 was passed over a zinc oxide catalyst at 350° C. A mixture of α-ethyl propionaldehyde (65%), α-ethyl acrolein (20%) and a 10 carbon atom unsaturated aldehyde (15%) were obtained.

Example XIV is typical of the course of the reaction when incomplete rearrangement is had. One obtains a complex mixture of isomeric dehydrogenated and higher compounds as unsaturated and saturated aldehydes, ketones as well as unconverted unsaturated alcohols and ethers. The reaction can be controlled to yield various kinds of these mixtures wherein one component predominates, as for example, one may obtain as end-product a saturated aldehyde or ketone in solution with an analogous unsaturated aldehyde or unsaturated ketone, respectively, via treatment of an unsaturated primary or secondary alcohol, respectively, or may obtain a solution of the end-product with the unconverted raw material, or may obtain admixtures of the isomeric and/or analogous compounds of the same class with unconverted raw material.

The products, so obtained, can be utilized as resin-forming bodies per se or by condensation with well-known agents as aldehydes, ketones, phenols, amines, ethers, etc. Further, the products obtained can be utilized to introduce saturated or unsaturated hydrocarbon groups into organic compounds by condensation or by the use of organo metallo derivatives. The compounds can also be oxidized to oxidation products of solvent, esterification and pharmaceutical value.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for the conversion of a monoolefinic primary alcohol containing an unsaturated tertiary carbon atom not more than once removed from the primary carbinol group primarily into its saturated isomer which comprises contacting said olefinic primary alcohol with a solid rearrangement catalyst comprising an active solid having a sorptive surface selected from the group consisting of siliceous material, charcoal and metal oxides at a temperature not substantially below 120° C. until a substantial proportion of the olefine alcohol has rearranged.

2. A process for the conversion of a monoolefinic primary alcohol containing an unsaturated tertiary carbon atom linked to the primary carbinol group primarily into its saturated isomer which comprises contacting said olefinic primary alcohol with a solid rearrangement catalyst comprising an active solid having a sorptive surface selected from the group consisting of siliceous material, charcoal and metal oxides at a temperature not substantially below 120° C. until a substantial proportion of the olefine alcohol has rearranged.

3. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising an active solid having a sorptive surface selected from the group consisting of siliceous material, charcoal and metal oxides at a temperature not substantially below 120° C. until a substantial proportion of the unsaturated compound has rearranged.

4. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising an active siliceous material having a sorptive surface at a temperature not substantially below 120° C. until a substantial proportion of the unsaturated compound has rearranged.

5. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising an active metal oxide having a sorptive surface at a temperature not substantially below 120° C. until a substantial proportion of the unsaturated compound has rearranged.

6. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising an active charcoal having a sorptive surface at a temperature not substantially below 120° C. until a substantial proportion of the unsaturated compound has rearranged.

7. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising a porous porcelain having a sorptive surface at a temperature not substantially below 120° C. until a substantial proportion of the unsaturated compound has rearranged.

8. A process for the conversion of an unsaturated compound of the class consisting of unsaturated primary alcohols containing a double bond linked to a tertiary carbon atom and the unsaturated symmetrical ethers of such unsaturated primary alcohols primarily into a saturated compound isomeric to the unsaturated primary alcohol which comprises contacting the unsaturated compound with a solid rearrangement catalyst essentially comprising alumina having a sorptive surface at a temperature not substantially below 120° C. until a substantial proportion of the unsaturated compound has rearranged.

9. As a novel composition of matter: a complex mixture of saturated and unsaturated compounds of the class consisting of aldehydes, ketones, unsaturated alcohols containing a double bond linked to a tertiary carbon atom, and the unsaturated ethers of such alcohols, said mixture being obtained by contacting a mixture of unsaturated alcohols containing a double bond linked to a tertiary carbon atom and the ethers of such alcohols with a solid rearrangement catalyst comprising an active solid having a sorptive surface selected from the group consisting of siliceous material, charcoal and metal oxides at a temperature at which rearrangement occurs.

10. As a novel composition of matter: a complex mixture of analogous saturated and unsaturated aldehydes and ketones containing at least four carbon atoms to the molecule, with the saturated compound comprising the major component, said mixture being obtained by contacting an unsaturated alcohol containing a double bond linked to a tertiary carbon atom with a solid rearrangement catalyst comprising an active solid having a sorptive surface selected from the group consisting of siliceous material, charcoal and metal oxides at a temperature at which rearrangement occurs.

11. As a novel composition of matter: a complex mixture of analogous saturated and unsaturated aldehydes containing at least four carbon atoms to the molecule, and obtained by contacting a mixture of unsaturated alcohols containing a double bond linked to a tertiary carbon atom with a solid rearrangement catalyst comprising an active solid having a sorptive surface selected from the group consisting of siliceous material, charcoal and metal oxides at a temperature at which rearrangement occurs.

12. As a novel composition of matter: a complex mixture of analogous saturated and unsaturated aldehydes containing at least four carbon atoms to the molecule, with the saturated aldehydes in excess, obtained by contacting an unsaturated alcohol containing a double bond linked to a tertiary carbon atom with a solid rearrangement catalyst comprising an active solid having a sorptive surface selected from the group consisting of siliceous material, charcoal and metal oxides at a temperature at which rearrangement occurs.

13. As a novel composition of matter: a complex mixture comprising at least one unsaturated alcohol and at least one saturated aldehyde isomeric to it, said mixture being obtained by contacting an unsaturated primary alcohol containing a double bond linked to tertiary carbon atom with a solid rearrangement catalyst comprising an active solid having a sorptive surface selected from the group consisting of siliceous material, charcoal and metal oxides at a temperature at which rearrangement occurs.

14. As a novel composition of matter: a complex mixture comprising at least one unsaturated alcohol and at least one saturated ketone isomeric to it, said mixture being obtained by contacting an unsaturated secondary alcohol containing a double bond linked to a tertiary carbon atom with a solid rearrangement catalyst comprising an active solid having a sorptive surface selected from the group consisting of siliceous material, charcoal and metal oxides at a temperature at which rearrangement occurs.

15. A process for the conversion of an olefine primary alcohol containing a double bond linked to a tertiary carbon atom primarily into its saturated isomer which comprises contacting the olefine primary alcohol with a solid rearrangement catalyst comprising an active solid having a sorptive surface selected from the group consisting of siliceous material, charcoal and metal oxides at a temperature at which rearrangement occurs.

16. A process for the conversion of an olefine primary alcohol containing an unsaturated tertiary carbon atom linked to a primary carbinol group primarily into its saturated isomer which comprises passing the olefine primary alcohol into contact with a solid rearrangement catalyst essentially comprising an active siliceous material having a sorptive surface at a temperature not substantially below 120° C. until a substantial proportion of the olefine alcohol has rearranged.

17. A process for the conversion of an olefine primary alcohol containing a double bond linked to a tertiary carbon atom primarily into its saturated isomer which comprises contacting the olefine primary alcohol in the liquid phase with a solid rearrangement catalyst essentially comprising an active siliceous material having a sorptive surface at a temperature not substantially below 120° C. and under a pressure sufficiently high to maintain the olefine alcohol in the liquid phase at the operating temperature.

18. A process for the conversion of a primary olefine alcohol containing a double bond linked to a tertiary carbon atom primarily into its saturated isomer which comprises contacting the olefine alcohol with a solid rearrangement catalyst essentially comprising an active siliceous material having a sorptive surface at a temperature not substantially below 120° C. but below the temperature at which substantial dehydration of the unsaturated alcohol occurs, whereby rearrangement of the unsaturated alcohol to an isomeric saturated carbonylic compound takes place.

19. A process for the conversion of isobutenol

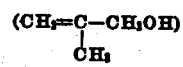

primarily into isobutyraldehyde which comprises contacting isobutenol with a solid rearrangement catalyst essentially comprising an active solid having a sorptive surface selected from the group consisting of siliceous material, charcoal and metal oxides at a temperature not substantially below 120° C. until a substantial proportion of the isobutenol has rearranged.

20. A process for the conversion of isobutenol

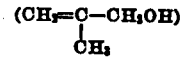

primarily into isobutyraldehyde which comprises contacting isobutenol in the liquid phase with a solid rearrangement catalyst essentially comprising an active solid having a sorptive surface selected from the group consisting of siliceous material, charcoal and metal oxides at a temperature not substantially below 120° C. and under a pressure sufficiently high to maintain the isobutenol in the liquid phase at the operating temperature.

21. A process for the conversion of isobutenol

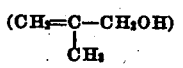

primarily into isobutyraldehyde which comprises passing the vapors of isobutenol into contact with a solid rearrangement catalyst essentially comprising an active siliceous material having a sorptive surface at a temperature not substantially below 120° C. until a substantial proportion of the isobutenol has rearranged to isobutyraldehyde.

22. A process for the conversion of isobutenol

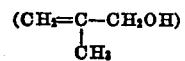

primarily into isobutyraldehyde which comprises contacting the isobutenol in the liquid phase with a solid rearrangement catalyst essentially comprising an active siliceous material having a sorptive surface at a temperature not substantially below 120° C. and under a pressure sufficiently high to maintain the isobutenol in the liquid phase at the operating temperature.

HERBERT P. A. GROLL.
CLARENCE J. OTT.